(12) United States Patent
Park et al.

(10) Patent No.: US 10,378,651 B2
(45) Date of Patent: Aug. 13, 2019

(54) SEAL RING (71) Applicant: Kabushiki Kaisha Riken, Tokyo (JP)

(72) Inventors: Namsun Park, Kashiwazaki (JP); Yoshiyuki Sato, Kashiwazaki (JP)

(73) Assignee: KABUSHIKI KAISHA RIKEN, Tokyo (JP)

(*) Notice: Subject to any disclaimer, the term of this patent is extended or adjusted under 35 U.S.C. 154(b) by 97 days.

(21) Appl. No.: 15/542,355

(22) PCT Filed: Dec. 15, 2015

(86) PCT No.: PCT/JP2015/085056
§ 371 (c)(1),
(2) Date: Jul. 7, 2017

(87) PCT Pub. No.: WO2016/111121
PCT Pub. Date: Jul. 14, 2016

(65) Prior Publication Data
US 2018/0274679 A1 Sep. 27, 2018

(30) Foreign Application Priority Data
Jan. 8, 2015 (JP) .................. 2015-002344

(51) Int. Cl.
*F16J 15/18* (2006.01)
*F16J 15/08* (2006.01)
(Continued)

(52) U.S. Cl.
CPC ........... *F16J 15/0887* (2013.01); *F16J 15/18* (2013.01); *F16J 15/441* (2013.01); *F16J 15/442* (2013.01); *F16J 15/46* (2013.01)

(58) Field of Classification Search
CPC ........ F16J 15/0887; F16J 15/166; F16J 15/18; F16J 15/441; F16J 15/442; F16J 15/46
See application file for complete search history.

(56) References Cited

U.S. PATENT DOCUMENTS 3,473,814 A * 10/1969 Bastow .................. F16J 15/166
277/436
3,771,801 A * 11/1973 Burke .................... F16J 15/166
277/461
(Continued)

FOREIGN PATENT DOCUMENTS

CN 1133955 A 10/1996
JP 2002-295692 A 10/2002
(Continued)

OTHER PUBLICATIONS

International Search Report in International Application No. PCT/JP2015/085056, filed Dec. 15, 2015.
(Continued)

*Primary Examiner* — Gilbert Y Lee
(74) *Attorney, Agent, or Firm* — Saliwanchik, Lloyd & Eisenschenk (57) ABSTRACT

[Object] To provide a seal ring that realizes excellent sealability irrespective of magnitude of hydraulic pressure.
[Solving Means] A seal ring includes an outer surface and side surfaces formed symmetrically about a plane perpendicular to a central axis. The outer surface includes a peak portion, first tapered surfaces, and second tapered surfaces. The peak portion is provided along the plane. A diameter of each of the first tapered surfaces is reduced with increased distance from the peak portion, each of the first tapered surfaces forming a first angle with respect to the central axis. Each of the second tapered surfaces is closer to each of the side surfaces than each of the first tapered surfaces is, a diameter of each of the second tapered surfaces being reduced with increased distance from each of the first tapered surfaces, each of the second tapered surfaces forming a second angle with respect to the central axis, the second angle being larger than the first angle.

6 Claims, 6 Drawing Sheets

(51) Int. Cl.
*F16J 15/46* (2006.01)
*F16J 15/44* (2006.01)

(56) References Cited

U.S. PATENT DOCUMENTS 5,524,905 A * 6/1996 Thoman ................ F16J 15/166
  277/572
5,632,494 A     5/1997 Oka

FOREIGN PATENT DOCUMENTS

| | | |
|---|---|---|
| JP | 2012-154387 A | 8/2012 |
| JP | 2012-255495 A | 12/2012 |
| JP | 2014-202221 A | 10/2014 |
| KR | 10-0219767 B1 | 9/1999 |
| WO | WO-2012/102250 A1 | 8/2012 |

OTHER PUBLICATIONS

Office Action dated Aug. 7, 2018 in Japanese Application No. 2015-002344, with its English Translation.
Office Action dated Feb. 2, 2018 in Chinese Application No. 201580071498.3, with its English Translation.
Office Action dated Apr. 4, 2018 in Korean Application No. 10-2017-7019773, with its partial English Translation.
Office Action dated Oct. 15, 2018 in Chinese Application No. 201580071498.3.

* cited by examiner

SEAL RING

CROSS-REFERENCE TO RELATED APPLICATIONS

This application is the U.S. national stage application of International Patent Application No. PCT/JP2015/085056, filed Dec. 15, 2015, which claims priority to Japanese Application No. 2015-002344, filed Jan. 8, 2015, the disclosures of each of which are incorporated herein by reference in their entirety.

TECHNICAL FIELD

The present disclosure relates to a seal ring applicable to a hydraulic machine.

BACKGROUND ART

A seal ring is used for a hydraulic machine such as an automatic transmission for a vehicle to prevent oil leakage. The seal ring seals a clearance between a shaft and a housing of a hydraulic machine, in which the shaft is inserted in the housing, for example. In this case, the seal ring is put in a groove of the shaft before inserting the shaft in the housing.

Typically, a seal ring has a rectangular cross-sectional shape (see Patent Literature 1). When hydraulic pressure is applied to such a seal ring, the side surface, which is opposite to the pressure-receiving side surface, comes in contact with the groove of the shaft, and in addition, the outer surface comes in contact with the inner surface of the housing. In this way, the seal ring, which comes in contact with the shaft and the housing, seals the clearance between the shaft and the housing.

CITATION LIST

Patent Literature

Patent Literature 1: Japanese Patent Application Laid-open No. 2012-255495

DISCLOSURE OF INVENTION

Technical Problem

When hydraulic pressure applied to the seal ring is increased, the seal ring may incline with respect to the shaft and the housing due to the pressure applied to the pressure-receiving side surface and the inner surface. In this case, the outer surface of the seal ring comes in insufficient contact with the inner surface of the housing, and the sealability of the seal ring is thus decreased.

In view of the above-mentioned circumstances, it is an object of the present disclosure to provide a seal ring that realizes excellent sealability irrespective of magnitude of hydraulic pressure.

Solution to Problem

To attain the above-mentioned object, according to an embodiment of the present disclosure, a seal ring includes an outer surface and side surfaces formed symmetrically about a plane perpendicular to a central axis.

The outer surface includes a peak portion, first tapered surfaces, and second tapered surfaces.

The peak portion is provided along the plane.

A diameter of each of the first tapered surfaces is reduced with increased distance from the peak portion, each of the first tapered surfaces forming a first angle with respect to the central axis.

Each of the second tapered surfaces is closer to each of the side surfaces than each of the first tapered surfaces is, a diameter of each of the second tapered surfaces being reduced with increased distance from each of the first tapered surfaces, each of the second tapered surfaces forming a second angle with respect to the central axis, the second angle being larger than the first angle.

According to the seal ring having this structure, a first tapered surface comes in surface-contact with the inner surface of the housing where hydraulic pressure is low, and a second tapered surface comes in surface-contact with the inner surface of the housing where hydraulic pressure is high. In other words, the seal ring comes in surface-contact with the inner surface of the housing irrespective of magnitude of hydraulic pressure, and high sealability is thus realized.

The first angle may be 0.1° or more and 1.0° or less, and the second angle may be 1.0° or more and 5.0° or less.

According to the seal ring having this structure, the first tapered surface and the second tapered surface come in surface-contact with the inner surface of the housing more accurately, and especially high sealability is thus realized.

A length of each of the second tapered surfaces in a direction of the central axis may be larger than a length of each of the first tapered surfaces in the direction of the central axis.

According to the seal ring having this structure, the area of the second tapered surface is larger, i.e., the area of a surface of the second tapered surface, which is in contact with the inner surface of the housing, is larger. Therefore more stable sealability is realized where hydraulic pressure is high.

The seal ring may further include R surfaces, each of the R surfaces connecting the outer surface and each of the side surfaces.

According to this structure, the seal ring is smoothly slidable on the shaft and the housing.

Each of the side surfaces may be closer to the plane with increased distance from the outer surface.

Each of the side surfaces may form a third angle with respect to the plane, the third angle being larger than the second angle.

According to this structure, the side surface of the seal ring hardly comes in surface-contact with the side surface of the groove. As a result, the seal ring has a small sliding resistance with respect to the groove of the shaft, and the friction loss between the seal ring and the groove of the shaft is thus reduced.

Advantageous Effects of Invention

It is possible to provide a seal ring that realizes excellent sealability irrespective of magnitude of hydraulic pressure.

MODE(S) FOR CARRYING OUT THE INVENTION

Hereinafter, an embodiment of the present disclosure will be described with reference to the drawings.

[Structure of Seal Ring 1]

Figure 1:
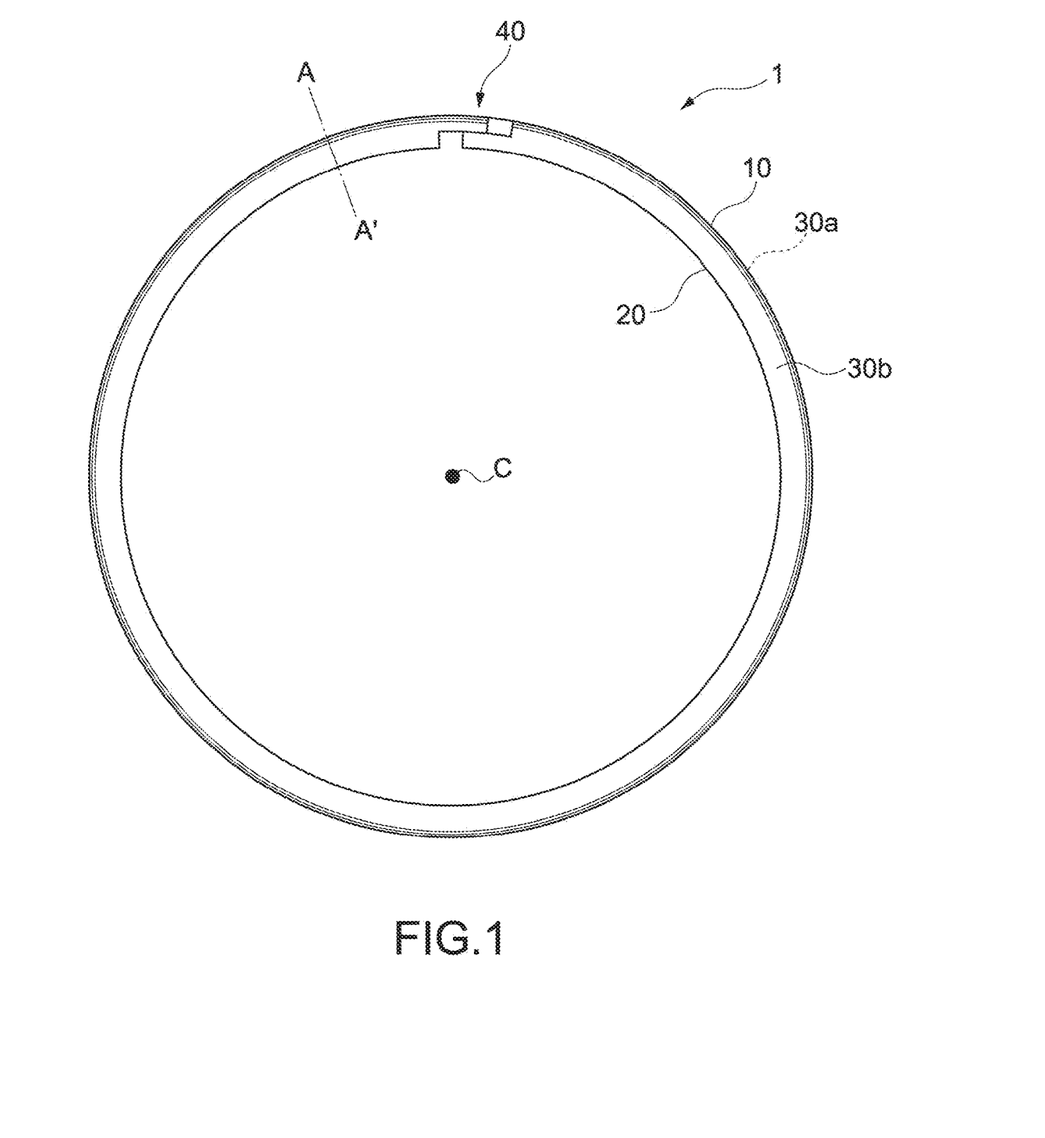
FIG. 1 A side view showing a seal ring according to an embodiment of the present disclosure.

FIG. 1 is a side view showing the seal ring 1 according to an embodiment of the present disclosure. The seal ring 1 of the present embodiment is applicable to various kinds of hydraulic machines such as hydraulic automatic transmissions for vehicles. The seal ring 1 is formed annularly around the central axis C being the center, and includes the outer surface 10, the inner surface 20, and the two side surfaces 30a, 30b.

The seal ring 1 includes the gap 40 at part of the seal ring 1 in the circumferential direction. The gap 40 opens slightly where the seal ring 1 is in the free state, in which no force is applied to the seal ring 1. The diameter of the seal ring 1 is increased where the gap 40 is expanded, and the diameter of the seal ring 1 is decreased where the gap 40 is narrowed.

The shape of the gap 40 is not specifically limited, and a known shape is applicable. As the gap 40, for example, a perpendicular (straight) gap, a diagonal (angle) gap, a stepped (step) gap, a double angle gap, a double cut gap, a triple step gap, or the like is applicable.

Further, preferably, the gap 40 has a mutually-engageable structure to reduce oil leakage from the gap 40. From this viewpoint, particularly preferably, the gap 40 is a stepped gap, a double angle gap, a double cut gap, a triple step gap, or the like, for example.

The material of the seal ring 1 can be determined as necessary depending on drive environments or the like. Preferably, the material of the seal ring 1 has an excellent sliding property to reduce a friction loss (frictional loss) of the seal ring 1. Further, preferably, the material of the seal ring 1 has an excellent heat-resistance property.

Examples of resin materials applicable to the seal ring 1 include polyetherketone (PEEK), polytetrafluoroethylene (PTFE), tetrafluoroetylene-perfluoroalkylvinylether copolymer (PFA), tetrafluoroethylene-ethylene copolymer (ETFE), polyvinylidene difluoride (PVDF), polyphenylenesulfide (PPS), and the like.

Figure 2A:
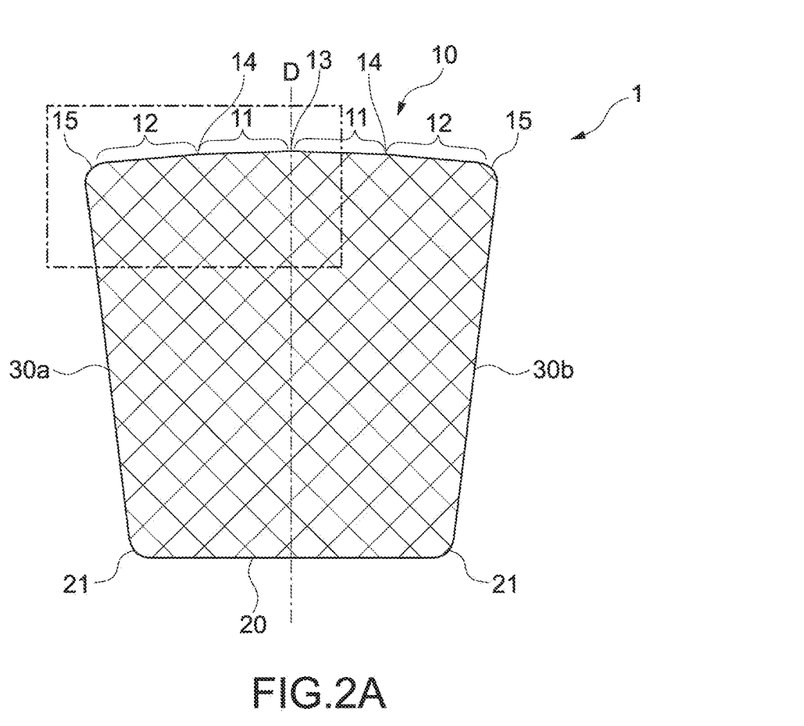
FIG. 2A A cross-sectional view showing the seal ring along the A-A' line of FIG. 1.
Figure 2B:
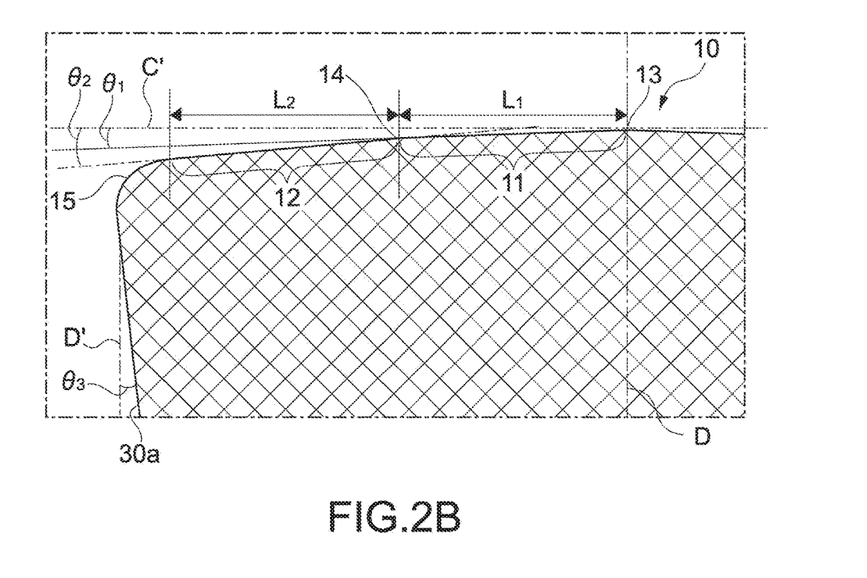
FIG. 2B A partial cross-sectional view showing part of the seal ring, surrounded by a dashed-chain line of FIG. 2, which is enlarged.

FIG. 2A is a cross-sectional view showing the seal ring 1 along the A-A' line of FIG. 1. FIG. 2B is a partial cross-sectional view showing part of the seal ring 1, surrounded by a dashed-chain line of FIG. 2A, which is enlarged.

The seal ring 1 has a shape symmetric about the central plane D, which is a plane perpendicular to the central axis C. Therefore the sealability of the seal ring 1 is independent of the orientation of the seal ring 1. Accordingly the seal ring 1 can be put in the groove G of the shaft S irrespective of its orientation.

In the seal ring 1, each of the first R surfaces 15 connects the outer surface 10 and each of the two side surfaces 30a, 30b, and each of the second R surfaces 21 connects the inner surface 20 and each of the two side surfaces 30a, 30b. Each of the R surfaces 15, 21 is structured as a convex curved surface. As described above, the seal ring 1 has the R surfaces 15, 21 being four corners, and is thus free of sharp edges. Therefore the seal ring 1 is smoothly slidable on the shaft S and the housing H.

The outer surface 10 of the seal ring 1 includes the peak portion 13, the first tapered surfaces 11, and the second tapered surfaces 12 in its circumferential direction.

The peak portion 13 is provided along the central plane D, and has the largest diameter on the outer surface 10. Each of the first tapered surfaces 11 extends from the peak portion 13 to each of the boundaries 14, each of the boundaries 14 being at a middle position between the central plane D and each of the side surfaces 13a, 13b. Each of the second tapered surfaces 12 extends from each of the boundaries 14 to each of the R surfaces 15. Each of the peak portion 13 and the boundaries 14 may be structured as a sharp edge, on which planes intersect with each other, or may include a curved surface such as an R surface.

FIG. 2B shows the axis C', which is in parallel with the central axis C, with a dashed-chain line. Each of the first tapered surfaces 11 forms the first angle $\theta_1$ with respect to the central axis C, and each of the second tapered surfaces 12 forms the second angle $\theta_2$ with respect to the central axis C. The second angle $\theta_2$ of each of the second tapered surfaces 12 is larger than the first angle $\theta_1$ of each of the first tapered surfaces 11. In other words, the outer surface 10 is structured such that the outer surface 10 is inclined downward from the peak portion 13 toward the side surfaces 30a, 30b and that the inclination increases at the boundaries 14.

The first angle $\theta_1$ of each of the first tapered surfaces 11 and the second angle $\theta_2$ of each of the second tapered surfaces 12 are determined depending on magnitude of hydraulic pressure to be applied to the seal ring 1 and the like. For example, the seal ring 1 for a typical hydraulic machine preferably has the first angle $\theta_1$ of 0.1° or more and 1.0° or less, and preferably has the second angle $\theta_2$ of 1.0° or more and 5.0° or less.

Further, each of the first tapered surfaces 11 has the first length $L_1$ in the central axis C direction, and each of the second tapered surfaces 12 has the second length $L_2$ in the central axis C direction. The first length $L_1$ of each of the first tapered surfaces 11 and the second length $L_2$ of each of the second tapered surfaces 12 may be determined as necessary.

However, preferably, the second length $L_2$ of each of the second tapered surfaces 12 is larger than the first length $L_1$ of each of the first tapered surfaces 11 to keep the stable sealability under the high hydraulic pressure. Specifically, the second length $L_2$ is 1.2 times or more and 1.5 times or less of the first length $L_1$, preferably.

The two side surfaces 30a, 30b of the seal ring 1 are formed tapered such that the width is decreased from the outer surface 10 side to the inner surface 20 side. According to the present embodiment, the side surface 30a is structured as the sealing side surface 30a, which comes in contact with the upper edge of the groove G of the shaft S, and the side surface 30b is structured as the pressure-receiving side surface 30b, which mainly receives hydraulic pressure.

FIG. 2B shows the plane D', which is in parallel with the central plane D, with a dashed-chain line. Each of the side surfaces 30a, 30b is structured as a plane that forms the third angle $\theta_3$ with respect to the central plane D. Preferably, the third angle $\theta_3$ of each of the side surfaces 30a, 30b is larger than the above-mentioned second angle $\theta_2$ of the second tapered surfaces 12.

Figure 3:
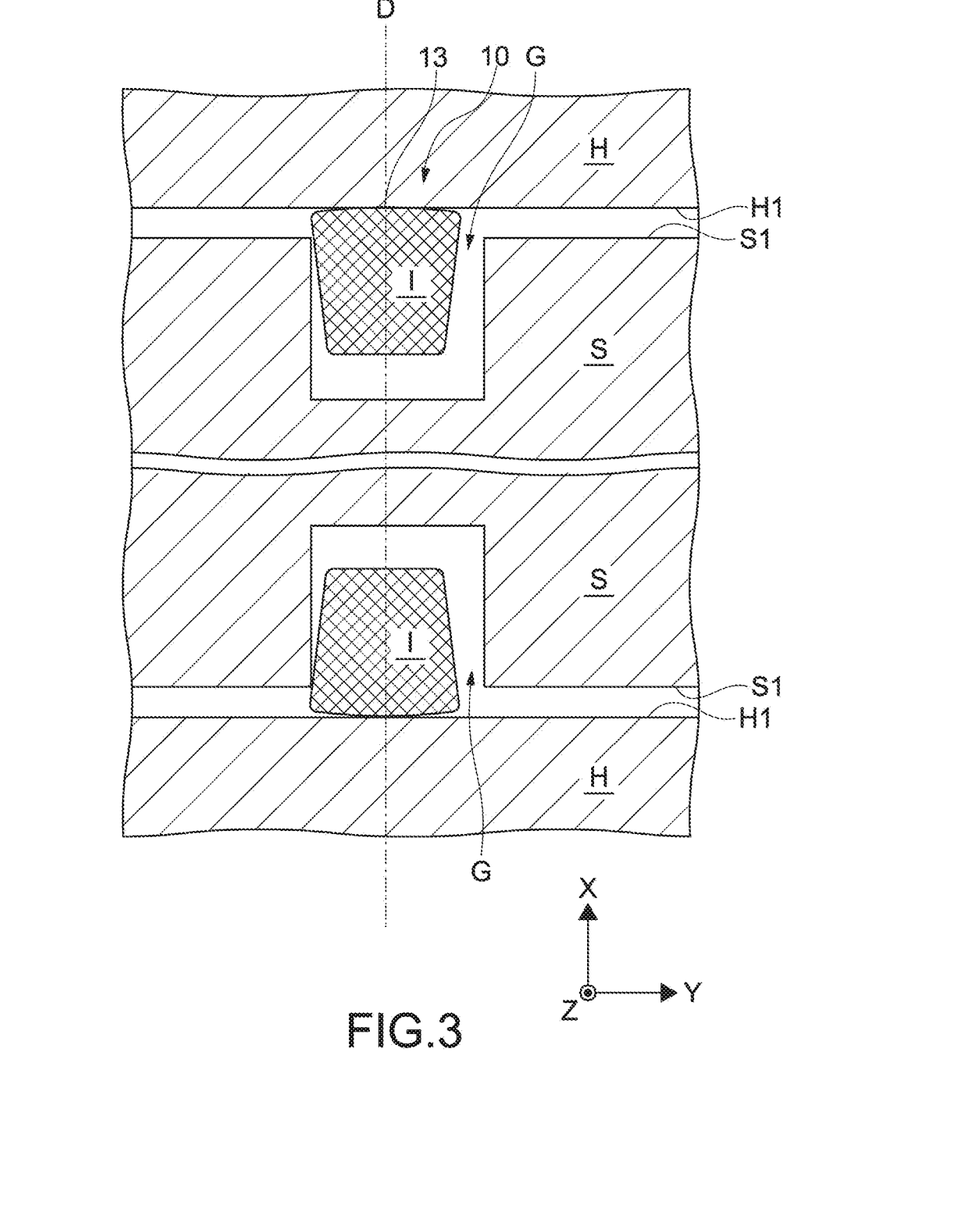
FIG. 3 A cross-sectional view schematically showing the seal ring embedded in a hydraulic machine.

FIG. 3 is a cross-sectional view schematically showing the seal ring 1 embedded in a hydraulic machine. FIG. 3 shows a structure in which the seal ring 1 is put in the groove G of the shaft S of the hydraulic machine, and the shaft S with the seal ring 1 is inserted in the housing H.

The diameter of the seal ring 1 embedded in the hydraulic machine is slightly smaller than the diameter of the seal ring 1 in the free state. In other words, the outer surface 10 of the seal ring 1 presses the inner surface H1 of the housing H with an elastic force, which is generated when the seal ring 1 is biased to return to the free state.

FIG. 3 shows a no-hydraulic-pressure state where no oil flows between the housing H and the shaft S and no hydraulic pressure is applied to the seal ring 1. In the no-hydraulic-pressure state, the peak portion 13 of the outer surface 10 of the seal ring 1 is in tangential-contact with the inner surface H1 of the housing H.

Figure 4A:
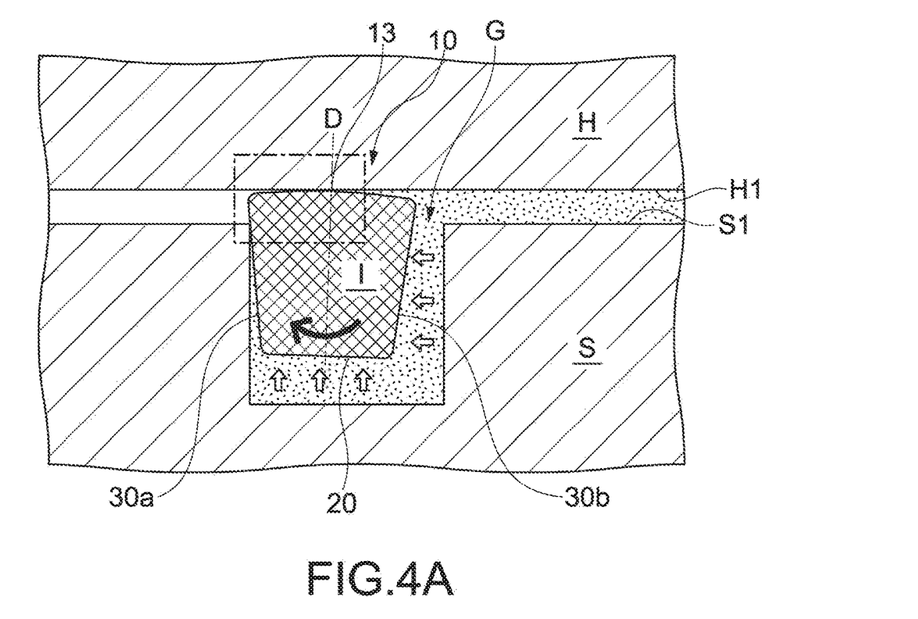
FIG. 4A A cross-sectional view showing the seal ring in a state where low hydraulic pressure is applied to the seal ring.
Figure 4B:
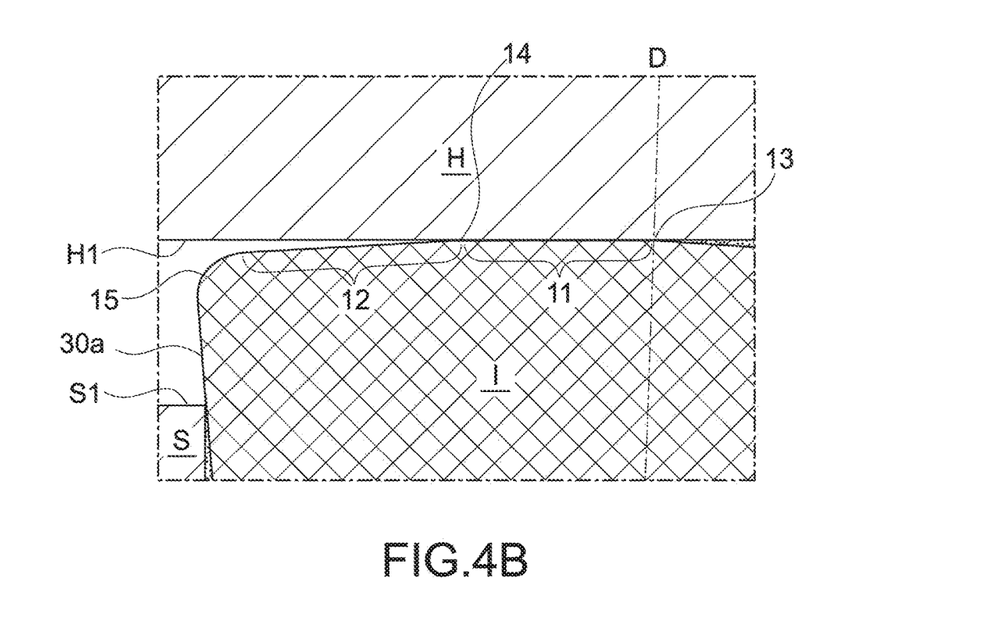
FIG. 4B A partial cross-sectional view showing part of the seal ring, surrounded by a dashed-chain line of FIG. 4A, which is enlarged.

Each of FIG. 4A and FIG. 4B shows a low-hydraulic-pressure state where oil flows between the housing H and the shaft S and low hydraulic pressure is applied to the seal ring 1. The hydraulic pressure in the low-hydraulic-pressure state is within a first range, which can be set depending on the condition of using the seal ring 1 and the like.

Where oil flows between the housing H and the shaft S, hydraulic pressure is applied mainly to the pressure-receiving side surface 30b and the inner surface 20. In other words, the pressure from the oil applied to the pressure-receiving side surface 30b is larger than the pressure from the oil applied to the sealing side surface 30a. As a result, when hydraulic pressure is applied, the seal ring 1 elastically deforms such that the entire circumference of the seal ring 1 inclines toward the sealing side surface 30a side, the peak portion 13 being the center.

In the low-hydraulic-pressure state of the seal ring 1, the first tapered surface 11 inclines until the first tapered surface 11 comes in surface-contact with the inner surface H1 of the housing H. Then a first stable state, in which the first tapered surface 11 is in surface-contact with the inner surface H1 of the housing H, is established. In other words, when hydraulic pressure is applied to the seal ring 1, the contact mode of the seal ring 1 in contact with the inner surface H1 of the housing H is changed from the tangential-contact of FIG. 3 to the surface-contact of FIG. 4A and FIG. 4B.

In the first stable state, the first tapered surface 11 of the seal ring 1 is in surface-contact with the inner surface H1 of the housing H. In other words, the inner surface H1 of the housing H presses the first tapered surface 11. Therefore, in the first stable state, the seal ring 1 hardly deforms anymore since deformation of the shape of the seal ring 1 is restricted by the inner surface H1 of the housing H.

Further, in the first stable state, the seal ring 1 has an elastic force, which is generated when the elastically-deformed seal ring 1 is biased to return to the original shape. This elastic force works in the direction opposite to the direction of the pressure from the oil. As a result, in the first stable state, the seal ring 1 hardly further deforms elastically when the seal ring 1 receives hydraulic pressure.

As described above, in the low-hydraulic-pressure state, the seal ring 1 has excellent sealability since the first stable state, in which the first tapered surface 11 is in surface-contact with the inner surface H1 the housing H, is kept.

Figure 5A:
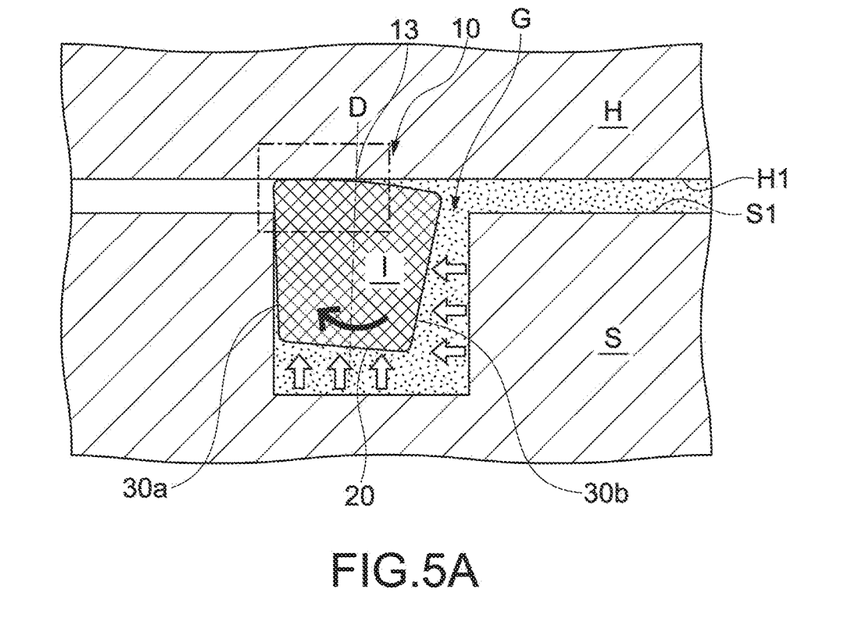
FIG. 5A A cross-sectional view showing the seal ring in a state where high hydraulic pressure is applied to the seal ring.
Figure 5B:
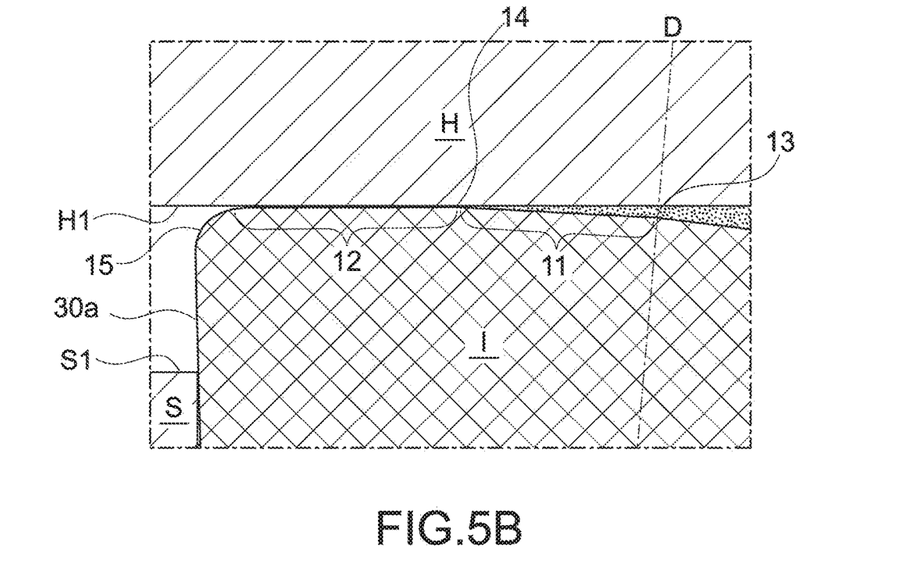
FIG. 5B A partial cross-sectional view showing part of the seal ring, surrounded by a dashed-chain line of FIG. 5A, which is enlarged.

Each of FIG. 5A and FIG. 5B shows a high-hydraulic-pressure state where more oil is flowing between the housing H and the shaft S after the state of FIG. 4A and FIG. 4B and high hydraulic pressure is applied to the seal ring 1.

The hydraulic pressure in the high-hydraulic-pressure state is within a second range, which can be set depending on the condition of using the seal ring 1 and the like. Note that the second range of hydraulic pressure in the high-hydraulic-pressure state is higher than the above-mentioned first range of hydraulic pressure in the low-hydraulic-pressure state.

When hydraulic pressure applied to the seal ring 1 is increased from the first range to the second range, the seal ring 1 cannot keep the above-mentioned first stable state, and the seal ring 1 elastically deforms such that the entire circumference of the seal ring 1 further inclines toward the sealing side surface 30a side, the peak portion 13 being the center.

In the high-hydraulic-pressure state of the seal ring 1, the second tapered surface 12 inclines until the second tapered surface 12 comes in surface-contact with the inner surface H1 of the housing H. Then a second stable state, in which the second tapered surface 12 is in surface-contact with the inner surface H1 of the housing H, is established. In other words, when hydraulic pressure applied to the seal ring 1 is increased from the first range to the second range, the seal ring 1 keeps the surface-contact with the inner surface H1 of the housing H.

Note that, in the present embodiment, as shown in FIG. 2B, the third angle $\theta_3$ of the sealing side surface 30a is larger than the second angle $\theta_2$ of the second tapered surface 12. Therefore, in the second stable state, the sealing side surface 30a of the seal ring 1 is not in surface-contact with but is apart from the side surface of the groove G of the shaft S. As a result, the seal ring 1 always has a small sliding resistance with respect to the groove G of the shaft S, and the friction loss between the seal ring 1 and the shaft S is thus reduced.

In the second stable state, the second tapered surface 12 of the seal ring 1 is in surface-contact with the inner surface H1 of the housing H. In other words, the inner surface H1 of the housing H presses the second tapered surface 12. Therefore, in the second stable state, the seal ring 1 hardly deforms anymore since deformation of the shape of the seal ring 1 is restricted by the inner surface H1 of the housing H.

The action of restricting deformation of the shape of the seal ring 1 by the inner surface H1 of the housing H is effectively realized as the area of the second tapered surface 12 is larger, i.e., as the area of a surface of the second tapered surface 12, which is in contact with the inner surface H1 of the housing H, is larger. Therefore the seal ring 1 further hardly deforms where the second length $L_2$ of the second tapered surface 12 is larger than the first length $L_1$ of the first tapered surface 11 as shown in FIG. 2B.

Further, in the second stable state, the seal ring 1 has an elastic force, which is generated when the elastically-deformed seal ring 1 is biased to return to the original shape. This elastic force is larger than the elastic force in the above-mentioned first stable state. As a result, in the second stable state, the seal ring 1 hardly further deforms elastically when the seal ring 1 receives the high hydraulic pressure.

As described above, in the high-hydraulic-pressure state, the seal ring 1 has excellent sealability since the second stable state, in which the second tapered surface 12 is in surface-contact with the inner surface H1 the housing H, is kept.

As described above, the seal ring 1 is in the first stable state in the low-hydraulic-pressure state, and is in the second stable state in the high-hydraulic-pressure state. As a result, the seal ring 1 is capable of realizing excellent sealability in both the low-hydraulic-pressure state and the high-hydraulic-pressure state. In other words, the seal ring 1 realizes excellent sealability irrespective of magnitude of hydraulic pressure.

[Design Examples of Seal Ring 1]

Designs of the seal ring 1 different from that of the above-mentioned embodiment may be employed.

Figure 6:
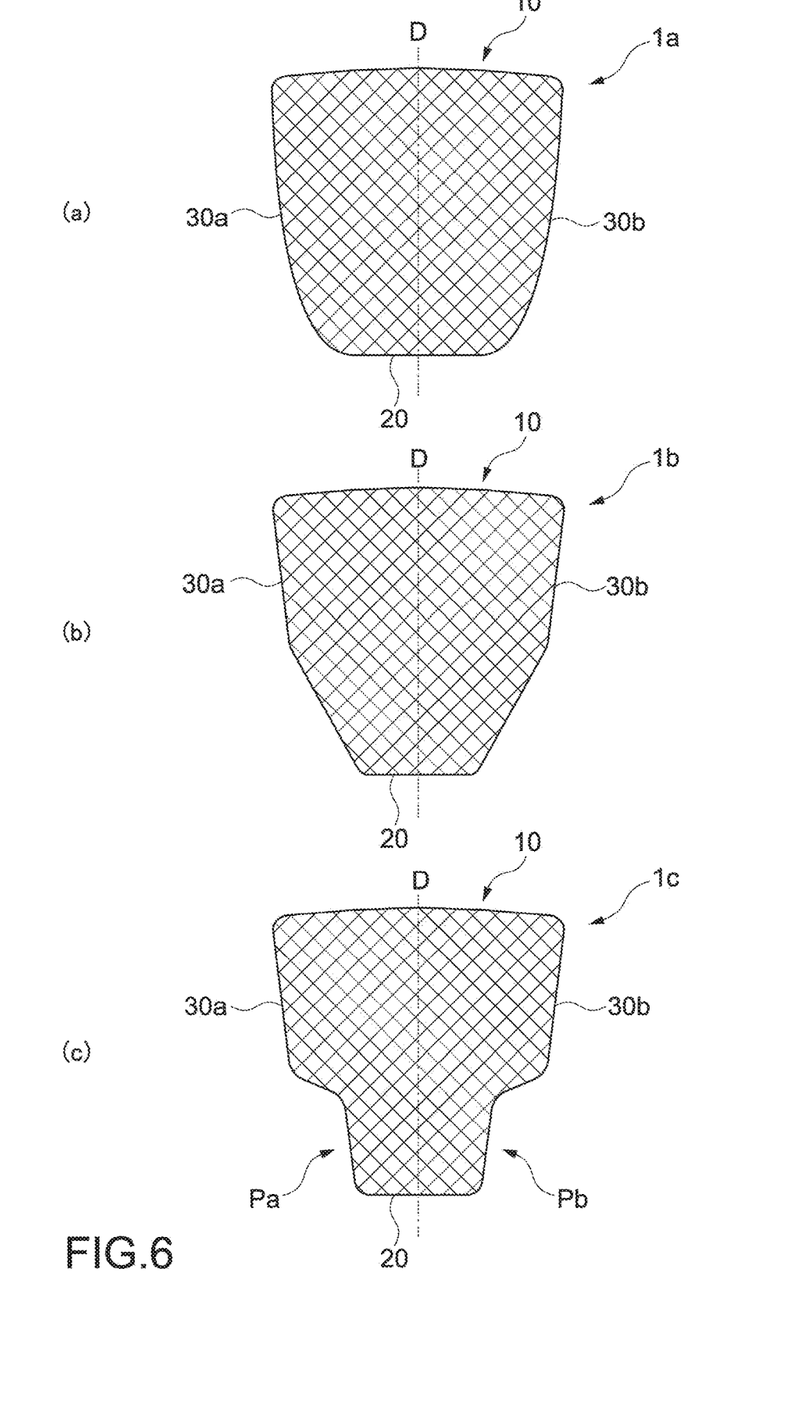
FIG. 6 Cross-sectional views each showing a design example of the seal ring of the present embodiment.

FIG. 6 includes cross-sectional views each showing a design example of the seal ring 1 of the present embodiment. In each of the seal rings 1a, 1b, 1c of the design examples of FIG. 6, only the structure of the side surfaces 30a, 30b is different from that of the seal ring 1 of the present embodiment.

In the seal ring 1a of FIG. 6(a), each of the side surfaces 30a, 30b is structured as a convex curved surface. According to this structure, the sealing side surface 30a is prevented from being in surface-contact with the side surface of the groove G of the shaft S. Therefore the friction loss between the seal ring 1a and the shaft S may be reduced.

In the seal ring 1b of FIG. 6(b), the angle of each of the side surfaces 30a, 30b with respect to the central plane D is not constant, but the angle is larger at the inner surface 20 side. According to this structure, more oil comes to the sealing side surface 30a side at the inner surface 20 side, and the pressure from the oil applied to the sealing side surface 30a is thus increased. As a result, the contact pressure of the sealing side surface 30a in contact with the groove G of the shaft S is reduced, and the friction loss between the seal ring 1b and the shaft S may thus be reduced.

In the seal ring 1c of FIG. 6(c), each of the side surfaces 30a, 30b includes each of the concave pockets Pa, Pb at the inner surface 20 side. According to this structure, oil flows into the pocket Pa at the sealing side surface 30a side, and the pressure from the oil applied to the sealing side surface 30a is thus increased. As a result, the contact pressure of the sealing side surface 30a in contact with the groove G of the shaft S is reduced, and the friction loss between the seal ring 1c and the shaft S may thus be reduced.

The embodiment of the present disclosure has been described above. The present disclosure is not limited only to the above-mentioned embodiment. As a matter of course, the present disclosure may be variously modified within the range of the gist of the present disclosure.

REFERENCE SIGNS LIST 1 seal ring
10 outer surface
11 first tapered surface
12 second tapered surface
13 peak portion
14 boundary
15 R surface
20 inner surface
30a, 30b side surface
C central axis
D central plane

The invention claimed is:

1. A seal ring, comprising:
an outer surface and an inner surface; and
side surfaces formed symmetrically about a plane perpendicular to a central axis, the side surfaces connecting the outer surface to the inner surface,
wherein the outer surface includes:
a peak portion provided along the plane;
first tapered surfaces, a diameter of each of the first tapered surfaces being reduced with increased distance from the peak portion, each of the first tapered surfaces forming a first angle with respect to the central axis; and
second tapered surfaces, each of the second tapered surfaces being closer to each of the side surfaces than each of the first tapered surfaces is, a diameter of each of the second tapered surfaces being reduced with increased distance from each of the first tapered surfaces, each of the second tapered surfaces forming a second angle with respect to the central axis, the second angle being larger than the first angle, and
wherein a width of the inner surface is narrower than a width of the outer surface such that a shortest distance between the side surfaces is smaller at the inner surface than it is at the outer surface.

2. The seal ring according to claim 1, wherein
the first angle is in a range of from 0.1° to 1.0°, and the second angle is in a range of from 1.0° to 5.0°.

3. The seal ring according to claim 1, wherein
a length of each of the second tapered surfaces in a direction of the central axis is larger than a length of each of the first tapered surfaces in the direction of the central axis.

4. The seal ring according to claim 1, further comprising:
R surfaces, each of the R surfaces connecting the outer surface and each of the side surfaces.

5. The seal ring according to claim 1, wherein each of the side surfaces is closer to the plane with increased distance from the outer surface.

6. The seal ring according to claim 5, wherein
each of the side surfaces forms a third angle with respect to the plane, the third angle being larger than the second angle.

* * * * *